US012556656B2

(12) United States Patent
Chen et al.

(10) Patent No.: US 12,556,656 B2
(45) Date of Patent: Feb. 17, 2026

(54) CONTROLLING PRIVATE COMMUNICATION CHANNELS AMONG PARTICIPANTS OF A VIRTUAL GROUP SETTING

(71) Applicant: International Business Machines Corporation, Armonk, NY (US)

(72) Inventors: Dong Chen, Beijing (CN); Ming Lei Zhang, Beijing (CN); Ting Ting Zhan, Beijing (CN); Yuan Jie Zhang, Ningbo (CN); Yin Xi Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 18/236,181

(22) Filed: Aug. 21, 2023

(65) Prior Publication Data
US 2025/0071238 A1    Feb. 27, 2025

(51) Int. Cl.
*H04N 7/15*  (2006.01)
*H04L 65/401*  (2022.01)

(52) U.S. Cl.
CPC ......... *H04N 7/152* (2013.01); *H04L 65/4015* (2013.01)

(58) Field of Classification Search
CPC . H04N 7/152; H04L 65/4015; H04L 65/1093; H04L 65/403
See application file for complete search history.

(56) References Cited

U.S. PATENT DOCUMENTS

2012/0128146 A1* 5/2012 Boss .................. H04M 3/564
379/202.01
2013/0198657 A1* 8/2013 Jones ................. H04L 12/1827
715/753
2018/0048683 A1* 2/2018 Katekar ............... H04L 65/403
2018/0359293 A1   12/2018 Faulkner et al.
2022/0321832 A1   10/2022 Lin et al.

FOREIGN PATENT DOCUMENTS

| CN | 102801770 A | 11/2012 |
| CN | 104580763 A | 4/2015 |
| WO | 2015131709 A1 | 9/2015 |

OTHER PUBLICATIONS

Hu et al., "FluidMeet: Enabling Frictionless Transitions Between In-Group, Between-Group, and Private Conversations During Virtual Breakout Meetings." CHI Conference on Human Factors in Computing Systems (CHI '22), Apr./May 2022, 17 pages.

* cited by examiner

*Primary Examiner* — Phung-Hoang J Nguyen
(74) *Attorney, Agent, or Firm* — Zilka-Kotab, P.C.

(57) ABSTRACT

A computer-implemented method, according to one approach, includes: receiving a request to add a subset of participants on a group call to a private communication channel. The group call includes a shared communication channel extending between the participants, the shared communication channel being configured to exchange information between the participants. The method further includes evaluating statuses of the participants in the subset. Moreover, in response to determining that the participants in the subset are not already included on a different private communication channel, and that the participants in the subset are not actively being added to a different private communication channel, the subset of participants are added to the private communication channel.

20 Claims, 8 Drawing Sheets

CONTROLLING PRIVATE COMMUNICATION CHANNELS AMONG PARTICIPANTS OF A VIRTUAL GROUP SETTING

BACKGROUND

The present invention relates to distributed communication systems, and more specifically, this invention relates to controlling private communication channels among participants of a virtual group setting.

Web conferencing is an umbrella term which includes various types of online audio and/or video collaborative services, including webinars, video calls, group calls using voice over Internet protocol, etc. Applications for web conferencing include meetings, training events, lectures, presentations shared between web-connected computers, etc.

Web conferencing has become a frequently used tool to facilitate virtual work meetings and other group environments, like online teaching.

SUMMARY

A computer-implemented method, according to one approach, includes: receiving a request to add a subset of participants on a group call to a private communication channel. The group call includes a shared communication channel extending between the participants, the shared communication channel being configured to exchange information between the participants. The method further includes evaluating statuses of the participants in the subset. Moreover, in response to determining that the participants in the subset are not already included on a different private communication channel, and that the participants in the subset are not actively being added to a different private communication channel, the subset of participants are added to the private communication channel.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a processor, and logic integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
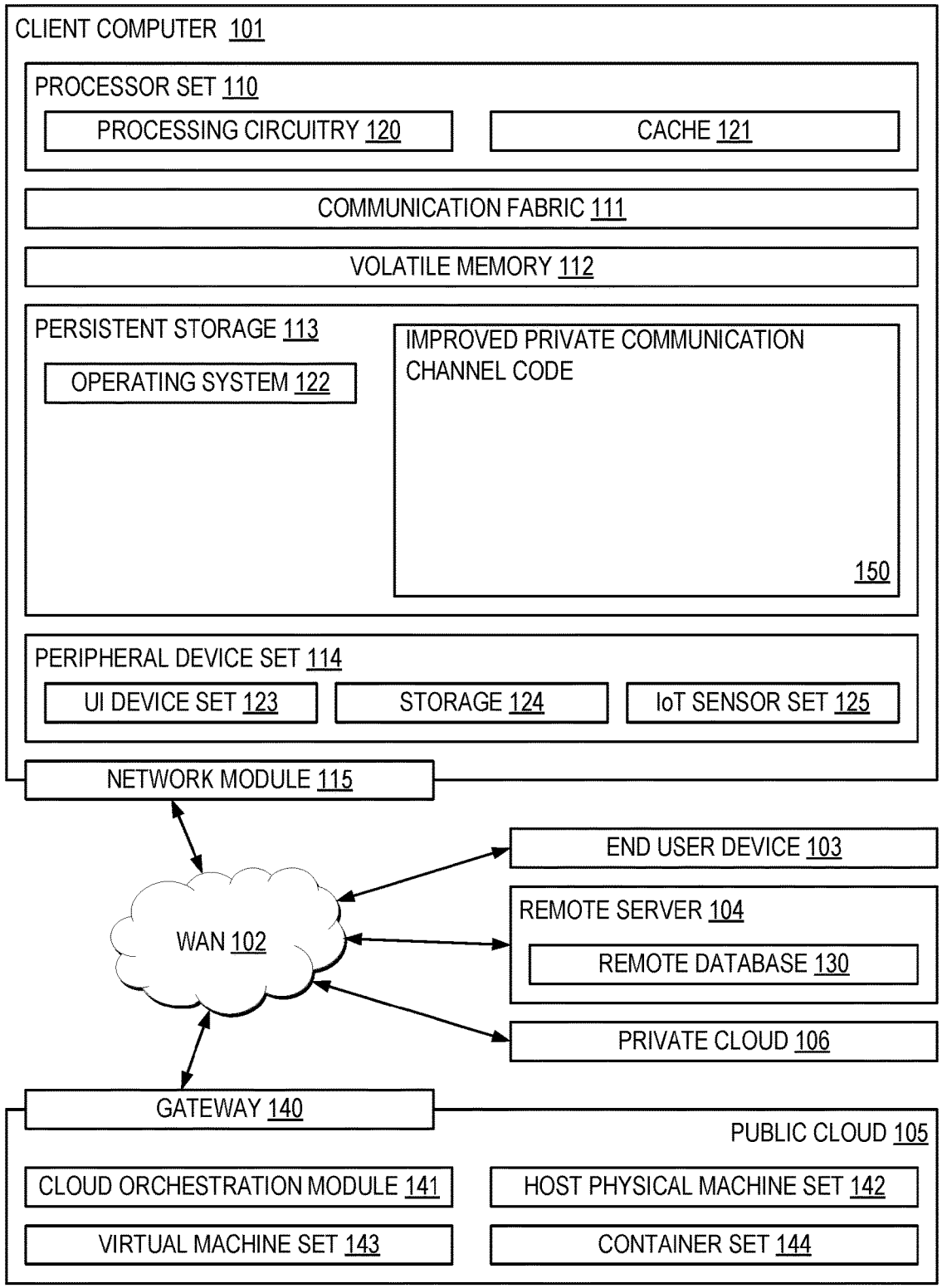
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for controlling private communication channels among participants of a virtual group setting, thereby achieving an efficient and scalable exchange of information between members in a group setting across a distributed system. Implementations herein are able to achieve this improved exchange of information at least in part by facilitating more than one different communication channel extending between members of a web conference. Communication efficacy for a web conference (e.g., group call) may thereby be improved by allowing two or more participants to establish and disconnect from private communication channels extending between select participants. Private communication channels may thereby be created and removed as requested, which improves the exchange of information between participants. Implementing these private communication channels also allows for a tunable communication path to be established between members of a group meeting, e.g., as will be described in further detail below.

In one general approach, a computer-implemented method includes: receiving a request to add a subset of participants on a group call to a private communication channel. The group call includes a shared communication channel extending between the participants, the shared communication channel being configured to exchange information between the participants. Thus, the private communication channels allow for participants in a virtual group setting to exchange information (e.g., speak) in private without disrupting a remainder of the participants. Conventional products have been unable to offer this ability, causing individuals to conduct private exchanges using different communication methods altogether. For example, two participants of a conventional group video call would resort to calling each other on a separate phone connection to communicate with each other without the remainder of the group video call hearing their exchange. This is a time consuming process that offers a limited exchange of information, while directing participants' attention away from the ongoing group call and reducing the experience of all participants involved.

The computer-implemented method also includes evaluating statuses of the participants in the subset. The status of a participant includes information about any current communication channels the participant is included on. The status may also provide information about the participant themself and any communication preferences they may have. Evaluating the status of the participant thereby provides valuable insight that may be used to improve the efficiency by which the participant may be added to a private communication channel, as well as the efficiency by which information may be sent between the participant and any other participants on a same private communication channel.

In response to determining that the participants in the subset are not already included on a different private communication channel, and that the participants in the subset are not actively being added to a different private communication channel, the computer-implemented method also includes adding the participants in the subset to the private communication channel. It is undesirable for an individual to be added to more than one private communication channel at a time. This avoids situations where information is inadvertently sent to an unintended participant on a group call, as well as other complications associated with a participant being part of multiple different communication channels, e.g., such as audio channel management.

In some implementations, the computer-implemented method includes denying the received request in response to determining that private communication channels are currently disabled on the group call. Approaches herein are thereby able to selectively enabled and disabled private communication channels according to the nature (e.g., subject matter) of an overarching group meeting. For example, private communication channels may automatically be disabled for certain types of web conferences, e.g., such as web-based testing environments. This allows for a specific type of communication interface (e.g., experience) to be achieved for any type of group setting, thereby improving the transfer of information between members of the group setting.

Moreover, a host of the group call is configured to enable and disable use of private communication channels on the group call in some implementations. In other words, access to private communication channels may further be controlled by a host (e.g., administrator) of an overarching group setting. The host may thereby adjust characteristics of a group setting (e.g., video conference) to achieve desired types of interactions between the various participants. Functionality may also be updated in real-time, thereby allowing the host to adjust to changes in performance as they occur during use, and improve performance as a whole.

In some implementations, instructions to enable or disable the use of private communication channels on the group call may be received. As noted above, participants of a group call may be added to private communication channels to facilitate the direct exchange of information between two or more specific participants of a larger web conference. While the private (e.g., selective) exchange of information across private communication channels is desirable in various situations, it may be undesirable and even detrimental in others. Thus, by allowing the use of private communication channels to be controlled, implementations herein are able to achieve a desired exchange of information between various participants of a group setting.

In some implementations, a host of a group call may be configured to enable or disable the use of private communication channels on the group call. Thus, the use of private communication channels on the group call may be enabled or disabled in response to in response to determining that instructions to do so were received from a host of the group call. Limiting the ability to enable or disable the use of private communication channels to a host of the group call desirably avoids situations where participants are able to change settings of the group call and potentially compromise information being exchanged over a shared communication channel of a group call.

As noted above, participants may be added to a private communication channel in response to determining the participants are not already included on a different private communication channel, and they are not actively being added to a different private communication channel. Accordingly, in some implementations participants may be denied from a private communication channel in response to determining one or more of the participants are already included on a different private communication channel, and/or that one or more of the participants are actively being added to a different private communication channel. Again, it is undesirable for an individual to be added to more than one private communication channel at a time. This avoids situations where information is inadvertently sent to an unintended participant on a group call, as well as other complications associated with a participant being part of multiple different communication channels, e.g., such as audio channel management.

The improvements achieved herein are also applicable for various types of web conferencing (e.g., web-based group environments). For example, a group call may include an audio and/or video call, during which audio and/or video information is exchanged between participants on the group call. It follows that the improvements achieved by the implementations herein may be experienced in any desired type of group setting that involves the exchange of information between the group members.

In some implementations, adding participants to a private communication channel includes updating the status of each participant to indicate they are actively being added to the private communication channel. Although the participants have not been added on a private communication channel, updating their status to indicate they are in the process of being added to one avoids situations where participants are inadvertently added to two or more private communication channels. This maintains a desired flow of information between the participants of a group call and avoids communication errors from occurring.

In some implementations, audio signals sent along a shared communication channel of a group call are assigned to a first audio channel configured to be played by a first speaker coupled to an electronic device of the respective participant. Similarly, audio signals sent along the private communication channel are assigned to a second audio channel configured to be played by a second speaker coupled to the electronic device. Assigning the audio signals to different audio channels allows for the different audio signals to be processed separately. For instance, the different audio signals may be sent to different speakers as noted above. Participants of a group call may thereby receive and interpret more than one different audio signal at the same time, increasing throughput of the system and increasing a participant's ability to interact with other participants on a group call.

In some implementations, the audio signals sent along a first audio channel may only be played by a first speaker, while audio signals sent along a second audio channel are only played by a second speaker. Selectively using speakers to play different audio signals allows individuals (e.g., participants) to focus on desired details and improve the rate at which information may be processed. This also improves the experience of participants on group calls, by allowing them to interact with other members of the group call without disrupting the remaining participants.

In other implementations, participants on a group call that are not included on a private communication channel may only receive the audio signals that are sent along a shared communication channel of the group call. Accordingly, audio signals sent along the shared communication channel may be assigned to first and second audio channels configured to be played by first and second speakers. In other words, participants of the group call that are not included on private communication channels are unable to access information being shared on the private communication channels. This provides members of the group call a distraction-free experience while also maintaining security of the information exchanged over the private communication channels.

In still other implementations, a notification requesting approval from a participant to join the private communication channel is sent to the respective participant. This provides the participant the ability to choose whether to join a private communication channel, and avoid undesirable or problematic connections.

In some implementations, a status of the respective participant is updated to indicate that the participant is currently being added on a private communication channel. Again, although the participant is not currently included on a private communication channel, the updated status avoids situations where participants are inadvertently added to two or more private communication channels. This maintains a desired flow of information between the participants of a group call and avoids communication errors.

In another general approach, a computer program product includes a computer readable storage medium having program instructions embodied therewith. The program instructions are readable by a processor, executable by the processor, or readable and executable by the processor, to cause the processor to: perform the foregoing method.

In another general approach, a system includes: a processor, and logic integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product implementation ("CPP implementation" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved private communication channel code at block 150 for enabling and disabling private conversations among participants of a virtual group setting. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some respects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, web conferencing is an umbrella term which includes various types of online audio and/or video collaborative services, including webinars, video calls, group calls using voice over Internet protocol, etc. Applications for web conferencing include meetings, training events, lectures, presentations shared between web-connected computers, etc. In general, web conferencing is made possible by Internet technologies which allow for communication to exist between different locations. Web conferencing thereby offers data streams of text-based messages, audio signals, video and/or still images, etc., to be shared simultaneously, across geographically dispersed locations.

Web conferencing has become a frequently used tool to facilitate virtual work meetings and other group environments, like online teaching. While it is beneficial for information to be exchanged between each location in a virtual meeting to emulate an in-person meeting, this may not be desirable in some situations. For instance, two participants on a group call may wish to have a private audio conversation without the other participants on the group call being able to hear their exchange. This private connection may be used to exchange personal information, prepare for an upcoming presentation to the other members, etc.

Conventional products have been unable to offer this ability, forcing individuals to conduct private exchanges of information using different communication channels altogether. For example, two participants of a group video call would need to resort to calling each other on a separate phone connection to communicate with each other without the remaining participants hearing their exchange. This is a time consuming process that offers limited information exchange, while directing participants' attention away from the ongoing group call and reducing the experience of all participants involved. Accordingly, there exists a need for ways of communicating with others in a group setting while protecting privacy of users and without negatively affecting the experience of the other participants.

In sharp contrast to these conventional shortcomings, implementations herein are desirably able to improve communication between participants of a web conference by implementing private communication channels therebetween. This is achieved at least in part by facilitating more than one different communication channel between members of a web conference. Communication efficacy for a web conference (e.g., group call) may thereby be improved by allowing two or more participants to establish and disconnect from private communication channels extending between select participants. Private communication channels may thereby be created and removed as requested, which improves the exchange of information between participants.

Implementing these private communication channels also allows for a tunable communication path to be established between members of a group meeting. Properties of these tunable communication paths may be adjusted to create a connection between two or more users that is able to exchange information as desired. Members of a web conference may thereby communicate with each other in confidence by selectively joining a private communication channel having desired characteristics, e.g., such as information encryption, multiple audio channels, etc., depending on the implementation. This improved functionality is also achieved without negatively impacting the experience of an overarching web conference, e.g., as will be described in further detail below.

Figure 2:
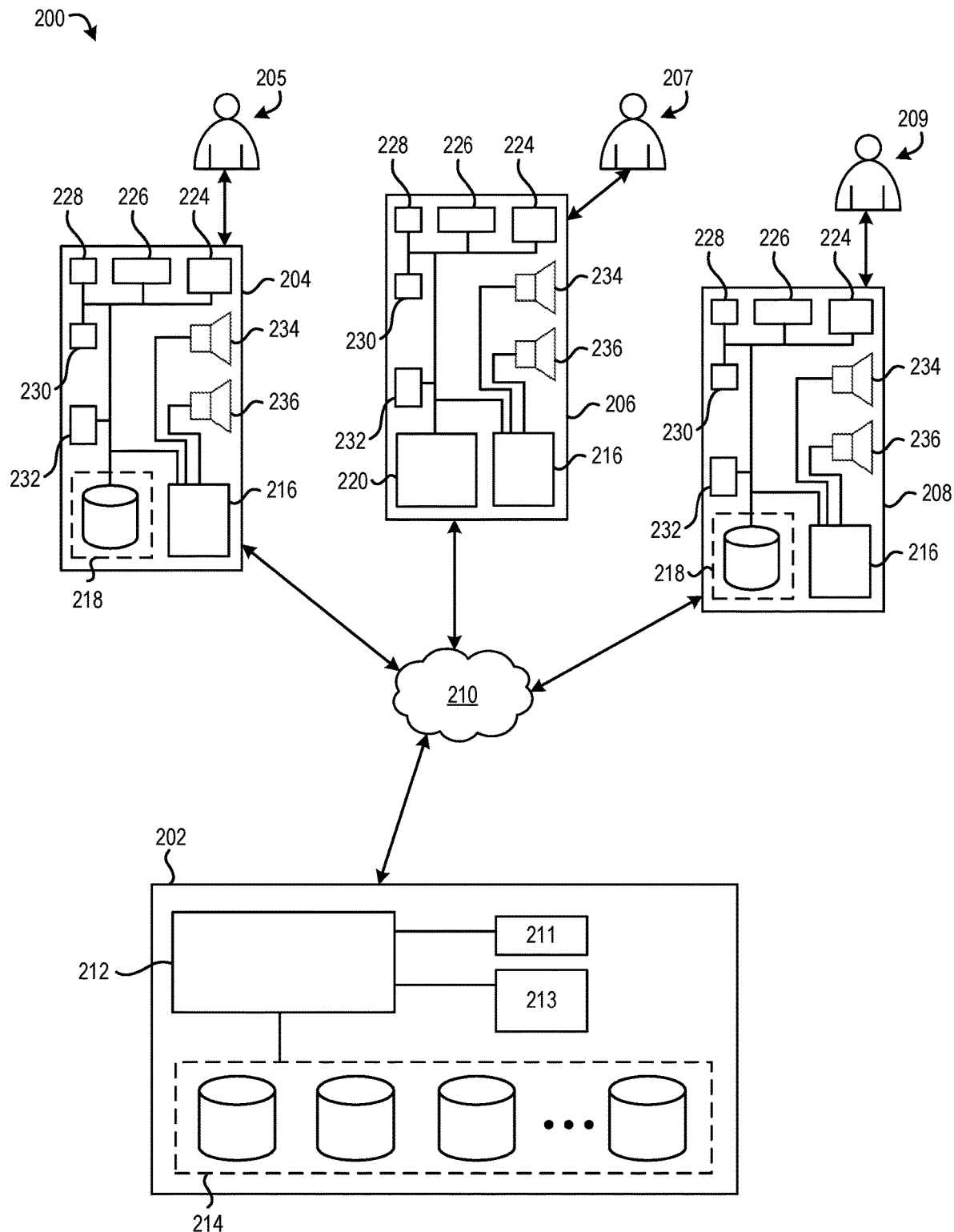
FIG. 2 is a representational view of a distributed system, in accordance with one approach.

Looking now to FIG. 2, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the system 200 includes a central server 202 that is connected to electronic devices 204, 206, 208 accessible to the respective users 205, 207, 209. Each of these electronic devices 204, 206, 208 and respective users 205, 207, 209 may be separated from each other such that they are positioned in different geographical locations. For instance, the central server 202 and electronic devices 204, 206, 208 are connected to a network 210.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between users 205, 207, 209 using the electronic devices 204, 206, 208 and/or central server 202, regardless of the amount of separation which exists therebetween, e.g., despite being positioned at different geographical locations.

However, it should also be noted that two or more of the electronic devices 204, 206, 208 and/or central server 202 may be connected differently depending on the approach. According to an example, which is in no way intended to limit the invention, two edge compute nodes may be located relatively close to each other and connected by a wired connection, e.g., a cable, a fiber-optic link, a wire, etc.; etc., or any other type of connection which would be apparent to one skilled in the art after reading the present description.

While each of the electronic devices 204, 206, 208 and central server 202 are shown as being connected to a same network 210, it should be noted that information may be sent between the locations differently depending on the implementation. According to an example, which is in no way intended to limit the invention, a shared (e.g., open) communication channel corresponding to a group video chat may be formed between each of the electronic devices 204, 206, 208. This shared communication channel may be formed by the processor 212 and channel management module 213 in response to a scheduled meeting, receiving an impromptu request from a user, a predetermined condition being met, etc. The shared communication channel thereby allows the users 205, 207, 209 to exchange information (e.g., audio signals, video images, typed messages, etc.) freely between each other.

As noted above, it may not always be desirable that information is sent to every participant of a group video chat. Accordingly, implementations herein allow for additional communication channels to share information between certain ones of the users over private (e.g., secure) communication channels. In other words, private communication channels may extend between subsets of participants on the group video chat, in addition to a shared communication channel that extends between each participant on the group video chat. These private communication channels may be activated and/or deactivated by a host (e.g., organizer) of the group video chat. Moreover, the information sent over private communication channels may be combined with information that is sent over a shared communication channel differently depending on the implementation, e.g., as will be described in further detail below.

It should be noted that while implementations herein are described in the context of information that is being exchanged between users, this is in no way intended to be limiting. For instance, while a "user" is described in approaches herein as an individual, the user may actually be an application, an organization, etc. The use of "data" and "information" herein is in no way intended to be limiting either, and may include any desired type of details, e.g., such as physical data storage locations, sensor readings, inputs received from users, logical data storage locations, logical to physical tables, data write details, etc.

With continued reference to FIG. 2, the electronic devices 204, 206, 208 are shown as having a different configuration than the central server 202. For example, in some implementations the central server 202 includes a large (e.g., robust) processor 212 coupled to a cache 211, a channel management module 213, and a data storage array 214 having a relatively high storage capacity. The central server 202 is thereby able to process and store a relatively large amount of data, as well as manage various communication paths that extend between different users. This allows the central server 202 to connect to, and manage, the exchange of information between multiple different remote user locations. For instance, this may be achieved at least in part by controlling which users are included on each existing communication path, e.g., as described in further detail below in method 300.

The central server 202 may also store at least some information about the different electronic devices 204, 206, 208 and/or users 205, 207, 209. For instance, user defined authentication information (e.g., passwords), activity-based information (e.g., geographic location), application preferences, performance metrics, etc., may be collected from the users 205, 207, 209 over time and stored in memory for future use. Additionally, at least some of the information that is collected from the users may be hashed and randomized before being stored in memory in some approaches. For instance, some approaches include encrypting and storing preferential selections, geographical location information, passwords, etc.

This information can later be used to customize at least certain details of a communication channel (e.g., path) that is created. For example, a machine learning model may be trained using details of past communication channels and the users given access thereto. The machine learning model may thereby be used to generate communication channels having characteristics selected based at least in part on patterns identified in the training data.

Looking now to the electronic devices 204, 206, 208, each are shown as including a processor 216 coupled to memory 218, 220. The memory implemented at each of the electronic devices 204, 206, 208 may be used to store data received from one or more sensors (not shown) in communication with the respective electronic devices, the users 205, 207, 209 themselves, the central server 202, different systems also connected to network 210, etc. It follows that different types of memory may be used. According to an example, which is in no way intended to limit the invention, electronic devices 204 and 208 may include hard disk drives as memory 218 while electronic device 206 includes a solid state memory module as memory 220.

The processor 216 is also connected to a display screen 224, a keyboard 226, a computer mouse 228, a microphone 230, and a camera 232. The processor 216 may thereby be configured to receive inputs from the keyboard 226 and computer mouse 228 as entered by the users 205, 207, 209. These inputs typically correspond to information presented on the display screen 224 while the entries were received. Moreover, the inputs received from the keyboard 226 and computer mouse 228 may impact the information shown on display screen 224, data stored in memory 218, 220, information collected from the microphone 230 and/or camera 232, status of an operating system being implemented by processor 216, etc.

Each of the electronic devices 204, 206, 208 are also shown as including a first speaker 234 and a second speaker 236. The speakers 234, 236 correspond to a different audio channel extending from processor 216. Accordingly, each of the speakers 234, 236 may be used to perform the same or different audio signals compared to each other.

It should also be noted that the display screen 224, the keyboard 226, the computer mouse 228, microphone 230, camera 232, and speakers 234, 236 are each coupled directly to the processor 216 in the present implementation. Accordingly, inputs received from the keyboard 226 and/or computer mouse 228 may be evaluated before being implemented in the operating system and/or shown on display screen 224. For example, processors 216 in the electronic devices 204, 206, 208 may perform any one or more of the operations described below in method 300 of FIG. 3 in order to improve the exchange of information between participants on a web conference.

While the electronic devices 204, 206, 208 are depicted as including similar components and/or design, it should again be noted that each of these electronic devices 204, 206, 208 may include any desired components which may be implemented in any desired configuration. In some instances, each user device (e.g., mobile phone, laptop computer, desktop computer, etc.) connected to a network may be configured differently to provide each location with a different functionality. According to an example, which is in no way intended to limit the invention, electronic devices 204 may include a cryptographic module (not shown) that allows the user 205 to produce encrypted data, while electronic devices 206 includes a data compression module (not shown) that allows for data to be compressed before being sent over the network 210 and/or stored in memory, thereby improving performance of the system by reducing network strain and/or compute overhead at the electronic device itself.

It follows that the different electronic devices (e.g., user devices) in system 200 may have different performance capabilities. As noted above, the central server 202 may have a higher storage capacity compared to the electronic devices 204, 206, 208. While this may allow the central server 202 the ability to store more data than the electronic devices 204, 206, 208, other factors impact performance. For example, traffic over network 210 may limit the amount of data that may be sent between the electronic devices 204, 206, 208. The workload experienced at each of the electronic devices 204, 206, 208 also impacts latency and limits the achievable performance at the respective locations and the system as a whole.

These varying performance characteristics have also had a material impact on the efficiency by which conventional systems are able to operate, particularly in view of the communication restrictions that conventional products have been forced to deal with. Again, implementations herein are even able to make real-time and preemptive adjustments to communication channel performance by monitoring and reacting to changes in bandwidth limitations, high-quality real-time media streaming, excess latency, network congestion, etc. Implementations may thereby be able to dynamically update settings of communication channels to maintain a high level of efficiency.

Figure 3A:
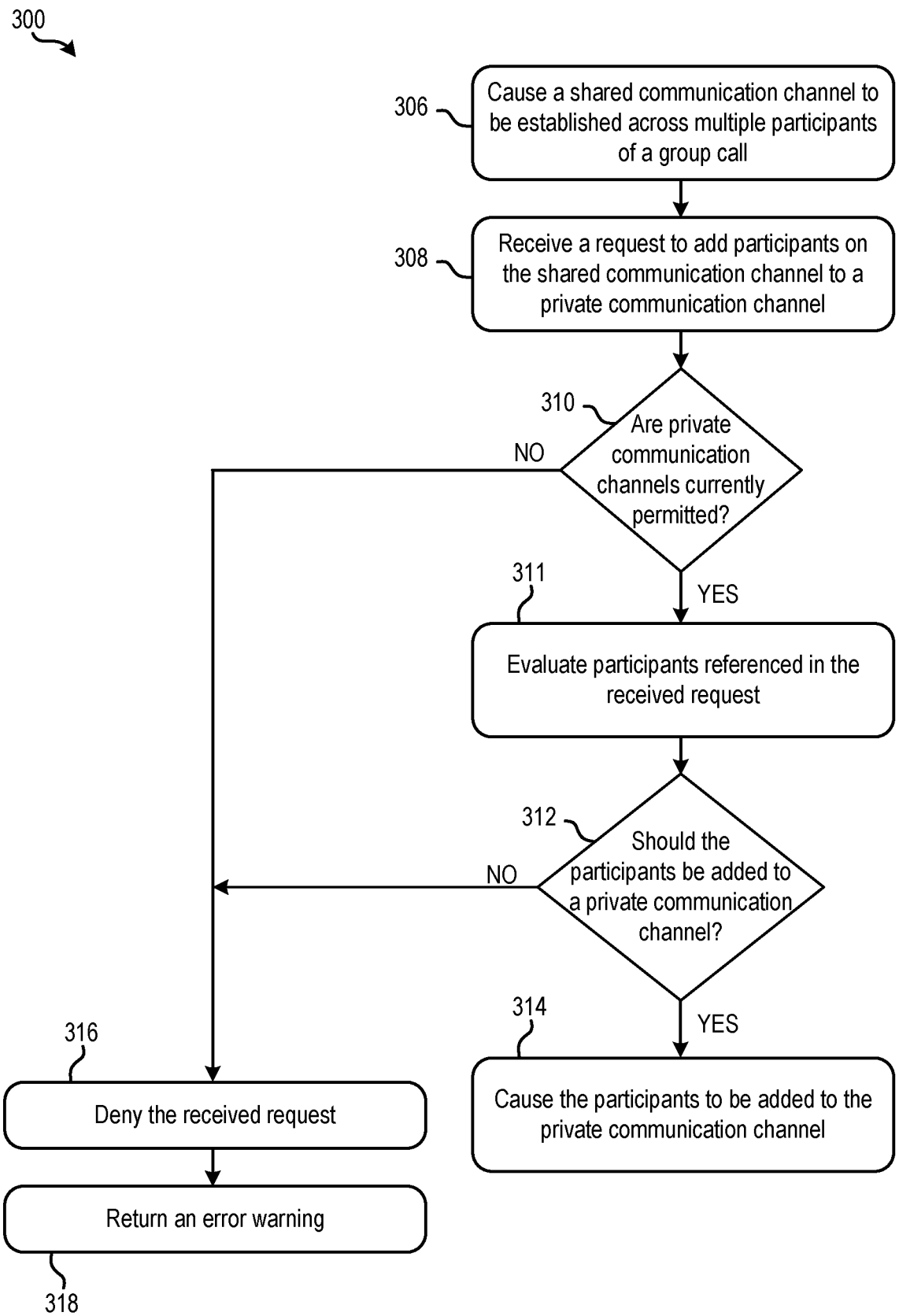
FIG. 3A is a flowchart of a method, in accordance with one approach.

Looking now to FIG. 3A, a flowchart of a computer-implemented method 300 for enabling private conversations among participants of a virtual group setting is illustrated in accordance with one approach. In other words, method 300 involves overlaying a shared communication channel of a web conference with private communication channels. Method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, one or more processors located at a central server of a distributed system (e.g., see central server 202 of FIG. 2 above) may be used to perform one or more of the operations in method 300.

Moreover, in various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Looking to FIG. 3A, operation 306 includes causing a shared communication channel to be established across multiple participants of a group call. The shared communication channel is preferably configured to enable information to be exchanged between each of the identified participants. Accordingly, audio data, video data, text information, requests, etc. may be sent between each of the participants that are added to a shared communication channel. This allows for each of the participants on the group call (e.g., web conference) to interact with each other despite being located at potentially different geographic locations. For example, each participant on a group video call can hear and see the remaining participants in real-time, which allows the group video call to emulate an in-person meeting and improve the experience for the participants.

One of the members of the shared communication channel may also be designated as a host (e.g., manager) of the web conference. For example, a user that used a calendar event to schedule a group call may be designated as a host of the resulting communication channels. The host may thereby be given control over certain aspects of the shared communication channels and/or the web conference as a whole. In some approaches, the host can selectively permit additional communication channels being used to transfer information between different ones of the group call participants. For example, the host can selectively enable or disable private communication channels between subsets of members that are also on a shared communication channel.

To improve security of the system, changes requested for the communication channels are preferably verified before being implemented. For instance, instructions received that involve disabling and/or enabling the use of private communication channels may be verified to avoid unauthorized changes to the characteristics of a group call. According to some approaches, only a host of the group call may be permitted to disable and/or enable the use of private communication channels.

The use of private communication channels on the group call may thereby be disabled or enabled as instructed in response to determining that the instructions were received from the host of the group call. In some approaches, a participant may be prompted to provide a unique host password before being able to disable or enable private communication channels on the group call, e.g., as would be appreciated by one skilled in the art after reading the present description. Private communication channels may also be enabled as a default in some approaches, while in others may disable private communication channels by default (e.g., to increase meeting security).

With continued reference to FIG. 3A, method 300 includes receiving a request to add a subset of participants on the shared communication channel to a private communication channel. See operation 308. As noted above, it may not always be desirable that information sent from one participant of a web conference is delivered to each of the remaining participants. For example, certain participants on a group video call may not be authorized to view confidential information. In another example, two participants on a group call may wish to speak in private during a group video call without the remaining participants hearing their conversation.

In some approaches, requests to form private communication channels and/or add members of a group call to private communication channels may originate from a member of the group call. However, this is in no way intended to be limiting. In other approaches, the request may be received automatically in response to a predetermined condition being met and/or other sources, e.g., such as an administrator.

Accordingly, private communication channels may be used to connect subsets of the total number of participants on a web conference such as a group call. In other words, these private communication channels can be used to exchange information between two or more web conference participants, where these exchanges supplement the shared communication channel already connecting each of the participants together. Characteristics of the private communication channels may also be adjusted to achieve a desired exchange of information between two or more participants. For example, some private communication channels are encrypted to improve data security.

In some approaches, the request received may involve adding two or more group call participants to an existing private communication channel. The existing private communication channel may have been established at startup of the system, leftover from a previous iteration of performing method 300, formed as a preliminary step of receiving the request, generated by a machine learning model trained using various details including past performance of the system, etc. In other approaches, the request may involve forming the private communication channel that the identified participants are to be added to. Accordingly, the request received in operation 308 may include direct instructions, desired details of the private communication channel, etc.

In response to receiving the request to add a subset of participants to a private communication channel, method 300 proceeds to operation 310. There, operation 310 includes performing a preliminary determination. Specifically, operation 310 includes determining whether private communication channels are currently permitted. In some situations, private communication channels may intentionally be disabled. For instance, a meeting host may be able to disable and/or enable private communication channels. According to one example, a teacher may disable private communication channels during an exam for a web-based classroom. However, after the exam is completed, the classroom host may enable private communication channels again to allow students to discuss a reading assignment in small groups without disrupting other class members.

In response to determining that private communication channels are not currently permitted, method 300 proceeds directly to operation 316. There, operation 316 includes denying the request received at operation 308. The process of denying the received request may involve sending an error warning to a source that originated the request. Accordingly, operation 318 further includes returning an error warning, indicating that the private communication channel request was denied. The error warning may be returned to a source of the initial request received. The error warning may also include information associated with why the request was denied and if any changes may be made.

Returning to operation 310, method 300 proceeds to operation 311 in response to determining that private communication channels are currently permitted. There, operation 311 includes evaluating the participants referenced in the received request to determine whether the participants should be added to a private communication channel as requested. See operation 312. Additional information may also be considered while making this determination.

In some situations, it is undesirable for certain participants to be added to a private communication channel. For example, it is undesirable that a group call participant is added to more than one private communication channel at a time. In other instances, it may be undesirable for a group call participant to be added to more than two total communication channels at a time. This avoids situations where information is inadvertently sent to an unintended participant on a group call, as well as other complications associated with a participant being part of three or more different communication channels, e.g., as would be appreciated by one skilled in the art after reading the present description. Accordingly, some group call participants may temporarily stop receiving and/or transmitting information over a shared communication channel to be added to two different private communication channels successfully.

The status of a respective participant may thereby include information outlining whether the participant is already included on a private communication channel. In preferred approaches, the status of each participant is incorporated into the evaluation performed at operation 311. In some implementations, which are in no way intended to limit the invention, the status of a group call participant may be represented by an online meeting private chat (OMPC) value or "tag value." The tag value may thereby indicate whether a respective participant is already on a private communication channel and/or in the process of being added to one. In some approaches, the status of each participant on a group call may be available to a host of the call. The host is thereby able to quickly determine which participants are currently interacting using private communication channels. The host may also be able to selectively add participants to, and remove participants from, one or more different private communication channels.

However, additional information may also be taken into consideration when performing the evaluation at operation 311. The topic of an overarching group call (e.g., online meeting) and/or the profiles of the meeting participants themselves may be considered when determining whether an individual should be prompted to enter a private chat state along with the other relevant participants. For instance, one or more machine learning models may be used to evaluate any available information pertaining to an ongoing group call and determine which participants should be prompted to join a private communication channel.

For instance, a machine learning model (e.g., a neural network) may be trained using labeled and/or unlabeled data corresponding to past performance of participants, previously conducted group calls with different participants, system performance, etc., according to any of the approaches described herein. Over time, the machine learning model may thereby be able to identify situations where certain group call participants are prompted to join a private communication channel. This understanding will allow the machine learning model to generate targeted and effective prompts, thereby improving the efficiency by which private communication channels may be established on a group call, e.g., as would be appreciated by one skilled in the art after reading the present description.

Machine learning models may also be trained to generate private communication channels having characteristics suited for a given implementation. For instance, one or more machine learning models may be trained to evaluate details associated with a group call and/or the participants thereof. According to an example, group calls involving more sensitive topics, e.g., such as medical information, may be identified as typically implementing private communication channels that comply with the Health Insurance Portability and Accountability Act (HIPAA). In another example, a group call participant may frequently use their camera during web conferencing which may impact the default settings of a private communication channel initiated (e.g., requested) by the group call participant. In still other situations, the relationship between the group call participants associated with a private communication channel request may also impact the type of interaction. For example, two students in a web-based classroom may be denied from being able to join a private communication channel, while a teacher may be allowed to open a private communication channel with other faculty members during a group class.

It should also be noted that implementations herein may use an application program interface (API) that is configured to collect the outputs (e.g., vectors) of a layer that are to be used as an input for a subsequent layer of a process, e.g., such as a machine learning model. Accordingly, the API can accomplish a seamless transition of data between the layers of a procedure. APIs may thereby be used to help facilitate the movement of data and flow of a method, e.g., as would be appreciated by one skilled in the art after reading the present description. For instance, the definition of the parameters to be passed between layers may be made generic in the API so that it can accommodate all tensors of different sizes based on the size of the output layer of each server.

As noted above, operation 312 includes determining whether each participant referenced in the request received at operation 308 should be added to the private communication channel. Specifically, operation 312 includes determining whether each of the associated participants should be added to the private communication channel. This determination may be made using any available information about the participants and/or the overarching web conference that is available. Accordingly, operation 312 may include determining a topic of the group call as well as any participant details, e.g., such as permission settings, participant preferences, current communication channels, etc. This information may be compared and even evaluated with machine learning models to determine whether each of the participants should be added to a private communication channel, and even characteristics of the private communication channel. It follows that the determination performed in operation 312 may be based at least in part on whether each of the participants are (i) already included on, or (ii) in the process of being added to, a different private communication channel.

Figure 3B:
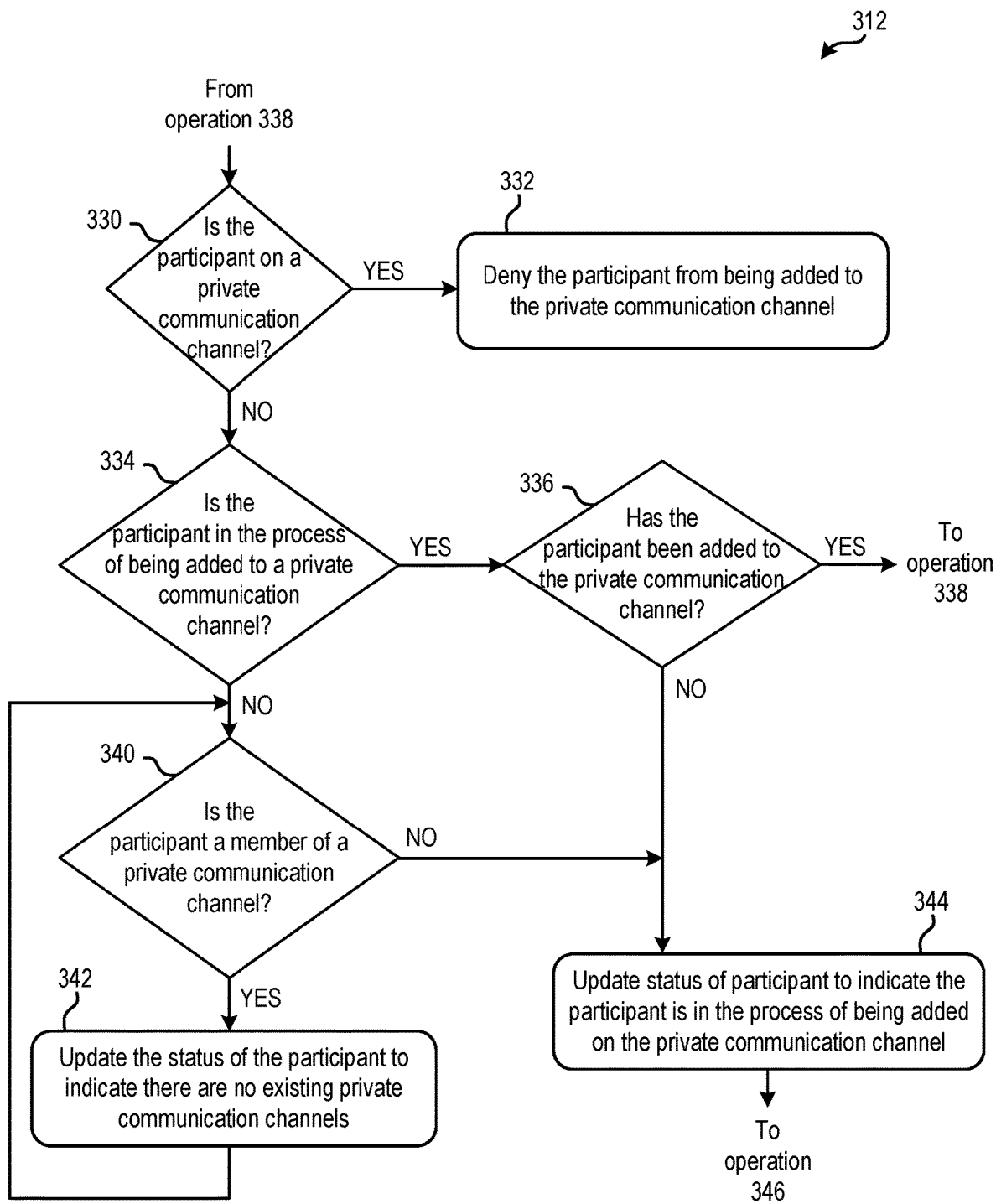
FIG. 3B is a flowchart of sub-processes for one of the operations in the method of FIG. 3A, in accordance with one approach.
Figure 3B:
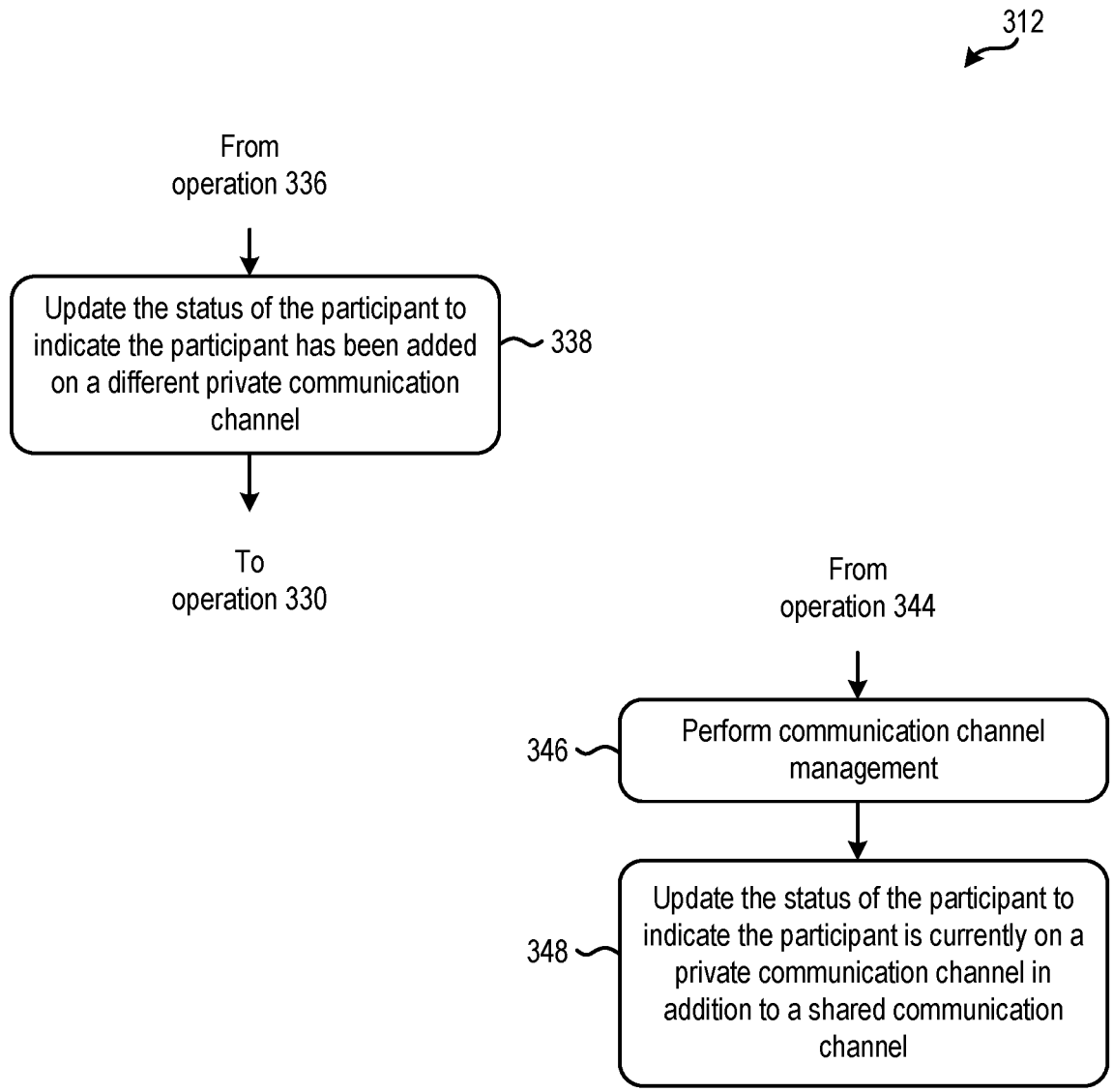

Referring momentarily to FIG. 3B, exemplary sub-operations of determining whether a given participant should be added to a private communication channel are illustrated in accordance with one approach. One or more of these sub-operations may thereby be used to perform operation 312 of FIG. 3A. However, it should be noted that the sub-operations of FIG. 3B are illustrated in accordance with one approach which is in no way intended to limit the invention.

As shown, sub-operation 330 of FIG. 3B includes determining whether a given one of the participants is currently included on a private communication channel. Thus, sub-operation 330 may include evaluating a status of the given participant which indicates whether the participant is already included on a different private communication channel. In response to determining that the participant is currently included on a different private communication channel, the flowchart proceeds to sub-operation 332 where the given participant is denied being added to the new private communication channel. Upon reaching sub-operation 332, the flowchart may progress to a next one of the referenced participants before returning to sub-operation 330 to determine whether the next participant is currently included on a private communication channel.

At sub-operation 330, the flowchart is shown as proceeding to sub-operation 334 in response to determining that the given participant is not currently included on a private communication channel. There, sub-operation 334 includes determining whether the given participant is in the process of being added to another private communication channel. Sub-operation 334 may thereby include reevaluating the status of the given participant. In response to determining that the participant is in the process of being added to another private communication channel, the flowchart proceeds to sub-operation 336. There, another determination is made as to whether the given participant may be removed from the existing private communication channel. In other words, sub-operation 336 includes determining whether the participant is successfully added to the other private communication channel.

In response to determining that the participant has been successfully added to the different private communication channel, the flowchart proceeds to sub-operation 338, where a status of the given participant is updated to indicate that the participant has been added on a different private communication channel. Upon performing sub-operation 338, the flowchart may progress to a next one of the referenced participants before returning to sub-operation 330 to determine whether the next participant is currently included on a private communication channel.

Returning to sub-operation 336, the flowchart jumps to sub-operation 344 in response to determining that the given participant has not been successfully added on the different private communication channel. There, sub-operation 344 includes updating a status of the given participant to indicate the participant is now in the process of being added on the requested private communication channel, e.g., as will soon become apparent.

Looking again to sub-operation 334, the flowchart proceeds further to sub-operation 340 in response to determining that the given participant is not in the process of being added to another private communication channel. There, sub-operation 340 includes confirming that the given participant is not currently a member of a private communication channel. In situations where sub-operation 340 fails to confirm the given participant is available to join a private communication channel, the flowchart proceeds to sub-operation 342 where a status of the given participant is updated to indicate no existing private communication channels, before repeating sub-operation 340.

In response to confirming that the given participant is not a member of a private communication channel, the flowchart proceeds from sub-operation 340 to sub-operation 344. There, sub-operation 344 includes updating a status of the given participant to indicate the participant is in the process of being added on the private communication channel.

Sub-operation 346 further includes performing communication channel management to help facilitate the exchange of information between the given participant and a remainder of the participants on the same private communication channel. In other words, sub-operation 346 includes performing communication channel management to ensure each participant receives information from appropriate ones of the other participants (e.g., see FIG. 3C below).

From sub-operation 346, the flowchart proceeds to sub-operation 348 where the status of the given participant is updated again to indicate that the participant is currently on a private communication channel in addition to a shared communication channel. Upon reaching sub-operation 348, the flowchart may progress to a next participant referenced in a communication request, before returning to sub-operation 330 to determine whether the next participant referenced in a private communication channel request is currently included on a different private communication channel.

Returning now to FIG. 3A, it follows that operation 312 may determine certain individuals are already included on a private communication channel in addition to a shared communication channel of a web conference. In response to determining that a participant of a group call is already included on or in the process of being added to another private communication channel, method 300 can proceed directly to operations 316 and 318, e.g., as described above.

However, method 300 proceeds to operation 314 in response to determining that participants associated with (e.g., referenced in) the received request are not already included on, or in the process of being added to, a different private communication channel. There, operation 314 includes causing the participants to be added to the private communication channel identified in the request. In other words, participants identified in the request received at operation 308 are added to a corresponding private communication channel in response to determining the participants are not already included on, or actively being added to, a different private communication channel.

In some situations, it may be desirable to obtain approval from each of the participants before they are added to a private communication channel. Accordingly, in some approaches, operation 314 may include performing a preliminary check that sends a notification requesting approval from each participant to join the private communication channel. Participants that return an approval may thereby be added to the private communication channel, while participants that do not approve of the private communication channel are not added.

It follows that method 300 is able to evaluate participants of a group setting to determine whether the participants may be added to private communication channels. As noted above, the process of adding a participant to and/or removing a participant from a private communication channel involves performing communication channel management to ensure each participant receives information from appropriate ones of the other participants.

For instance, audio signals (vocal signals) may be recorded from each of the participants on a group call differently depending on the type of communication channel(s) each participant is included on. For example, participants that are only included on the shared communication channel of a group call may communicate with each of the remaining participants. Accordingly, audio signals recorded from participants on a shared communication channel are distributed to each of the participants on the group call. These audio signal recordings may also be played over all available speaker channels at other participant locations. However, audio signals recorded from participants that are also on a private communication channel may only be delivered to the other participants on the same private communication channel and played over a certain speaker channel.

Figure 4:
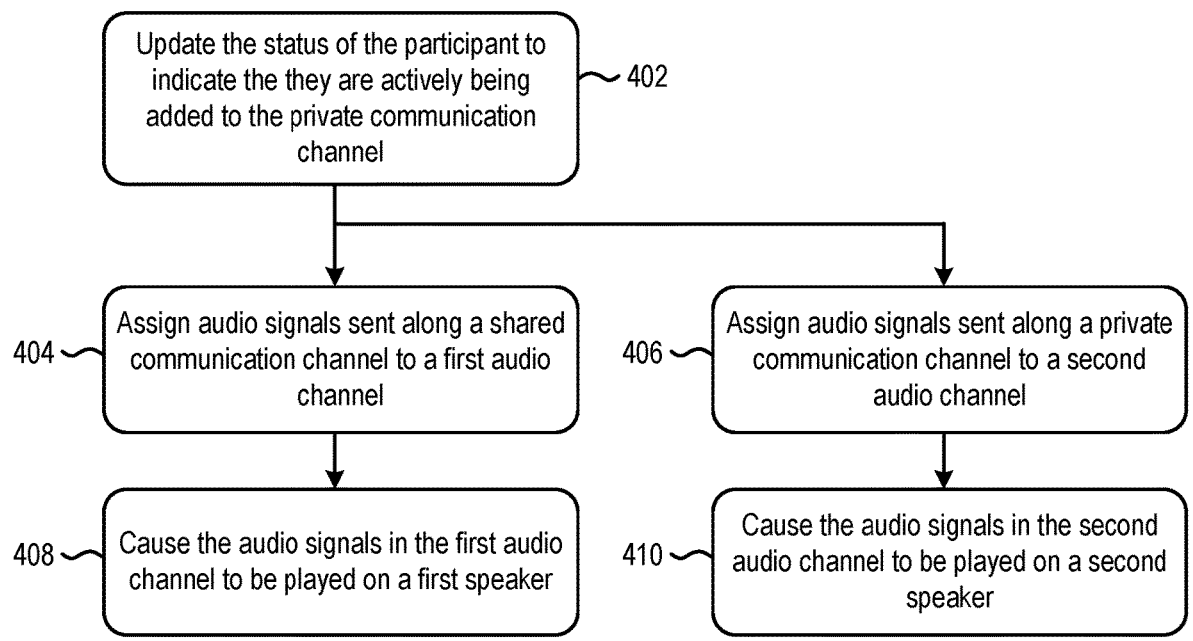
FIG. 4 is a flowchart of a method associated with performing communication channel management, in accordance with one approach.

Referring now to FIG. 4, exemplary operations of a method associated with performing communication channel management are illustrated in accordance with one approach. One or more of these operations may be performed in an iterative fashion to cause certain participants to be added to a private communication channel. Accordingly, FIG. 4 involves ensuring that audio signals (e.g., vocal signals) are recorded and delivered to the appropriate members of a group call. In some approaches, one or more of the operations in FIG. 4 may be used to perform sub-operation 346 of FIG. 3B for each identified participant. However, it should be noted that the operations of FIG. 4 are illustrated in accordance with one approach which is in no way intended to limit the invention.

Each of the steps of the flowchart in FIG. 4 may be performed by any suitable component of the operating environment using known techniques and/or techniques that would become readily apparent to one skilled in the art upon reading the present disclosure. For example, in various approaches, the operations may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more operations in FIG. 4. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 402 includes updating the status of the respective participant to indicate they are actively being added to the private communication channel. Operation 402 may thereby include updating an OMPC value or "tag value" of the respective participant to indicate they are beginning to be added to a private communication channel.

As noted above, participants that are on a private communication channel as well as a shared communication channel receive two different streams of information. These different streams are preferably kept separate to provide the participants the ability to process information from both sources. Accordingly, operation 404 includes assigning audio signals sent along a shared (e.g., open) communication channel to a first audio channel. Moreover, operation 406 includes assigning audio signals sent along the private communication channel to a second audio channel.

Because the different audio signals are correlated with different respective audio channels, they may be output separately on different speakers. For instance, operation 408 includes causing the audio signals in the first audio channel to be played on a first speaker, while operation 410 includes causing the audio signals of the second audio channel to be plated on a second speaker. The first audio channel may thereby be configured to be played by a first speaker of an electronic device of the respective participant, while the second audio channel is configured to be played by a second speaker of the electronic device. The participants on a private communication channel may thereby share a private conversation while still listening to the remaining participants on a shared communication channel.

In some approaches, audio signals sent along the shared communication channel are only played by a first speaker, while audio signals sent along the private communication channel are only played by the second speaker. For example, the audio received along a shared communication channel may be played in a "left" headphone, while audio received along a private communication channel is only played in a "left" headphone. In other approaches, the audio received along a shared communication channel may be played in one headphone, while audio received along a private communication channel is only played in both headphones. In other approaches, the audio received along a private communication channel may be played in one headphone, while audio received along a shared communication channel is only played in both headphones.

It follows that the operations in FIG. 4 are able to deliver two different streams of information to a participant on a private communication channel and a shared communication channel, thereby improving the transfer of information. Once a participant has been removed from a private communication channel, information (e.g., audio signals, video feeds, typed text, etc.) may only be received from other group call participants over the shared communication channel. Accordingly, audio signals received along the shared communication channel are assigned to both audio channels for participants not on a private communication channel. For example, audio signals received along a shared communication channel are played by both the first and second speakers.

It follows that the process of removing a participant from a private communication channel involves updating the status of the participant such that information is distributed correctly across a group call. In situations where it is determined that the status of a participant being removed from a private communication channel already indicates the participant is not currently on a private communication channel, the removal of that participant has effectively been completed.

However, the status of the participant being removed is preferably updated in response to determining it still indicates the participant is being added to a private communication channel. It may be concluded that the respective group call participant has been successfully removed from a private communication channel in response to the participant's status being updated.

In situations where the status of a participant indicates they remain on a private communication channel, channel management may be implemented to update how information is transferred between the participant and a remainder of the group call. As noted above, an audio channel dedicated to playing audio signals received along a private communication channel may be reassigned to play audio signals received along the shared communication channel. Thus, both speakers at a participant's location may play audio signals received from all other participant locations, while a microphone at the participant's location transmits audio signals to all other participant locations. In response to performing the channel management such that the participant has been removed from the private communication channel, the status of the participant is preferably updated to indicate this.

Again, approaches herein are able to selectively enabled and disabled private communication channels according to the nature (e.g., subject matter) of an overarching group meeting. For example, private communication channels may automatically be disabled for certain types of web conferences, e.g., such as web-based testing environments. Access to private communication channels may further be controlled by a host (e.g., administrator) of the group meeting. Moreover, participants in a group meeting may be added to and removed from a private chat as desired. The communication capabilities of a given group call participant can be represented by a respective status or "tag value." Accordingly, the process of adding group call participants to a private communication channel differs from the process of removing participants therefrom. The process of adding and/or removing participants from a private communication channel also differs depending on the status of the respective participant. This status may be represented by a counter, one or more flags, a host text entry, etc. Implementing private communication channels also allows for audio sources to be played on different audio channels by different speakers.

As a result, the privacy of web conference participants is maintained by providing the ability to discuss certain topics (e.g., sensitive issues) in private with one or more other participants (e.g., members) of the web conference. This also achieves improved communication efficiency for web conferences by allowing participants to communicate with each other without interrupting a group speaker or disturbing other participants. Interactivity for online meetings is also improved by implementations herein by allowing participants to share ideas with others and get feedback in real-time during an ongoing group meeting without causing a distraction. This further expands to multilingual web environments, allowing participants to translate the words of a main speaker and distribute this translation (e.g., audio signal) to other members of a private communication channel extending therebetween.

Figure 5:
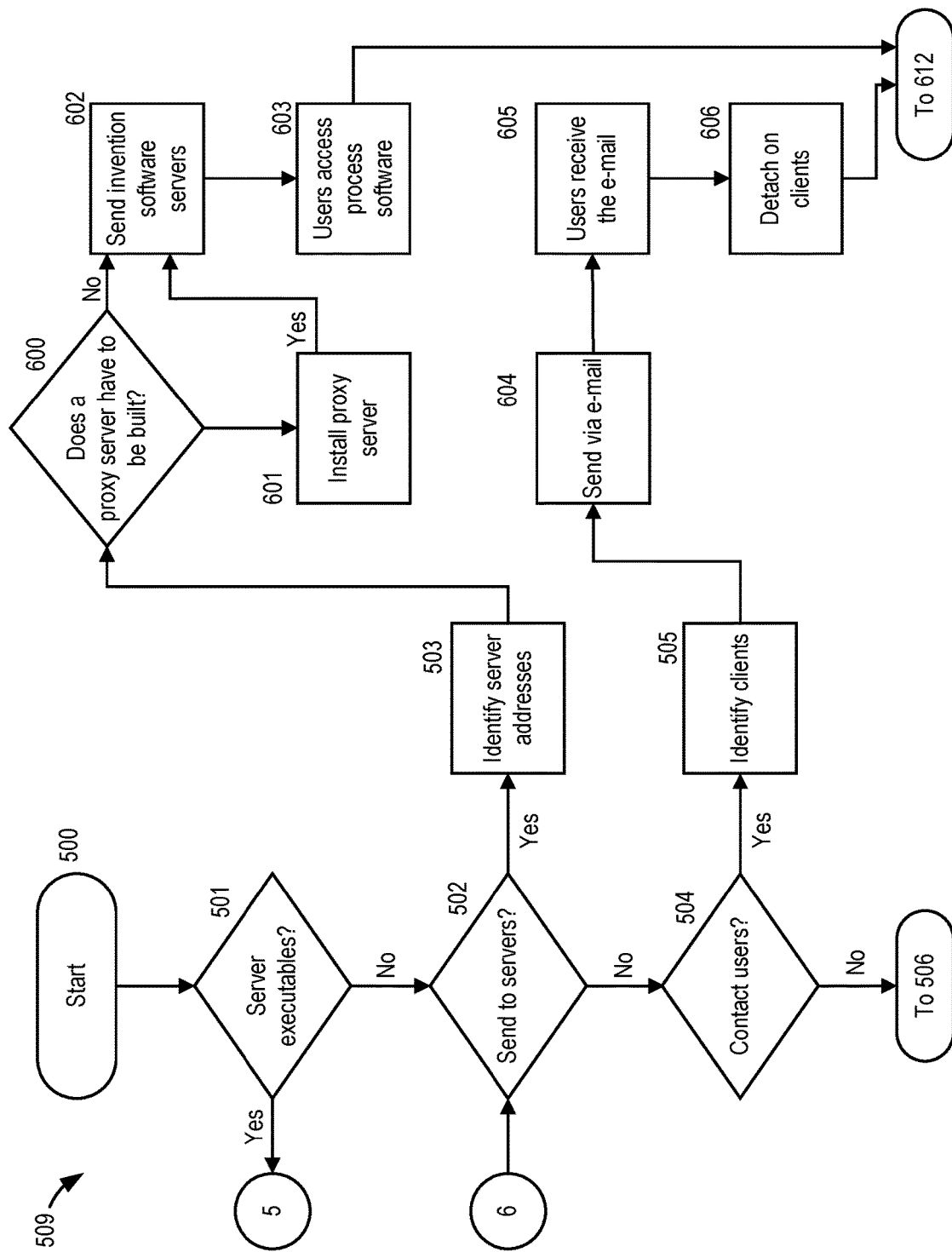
FIG. 5 is a flowchart of a method, in accordance with one approach.
Figure 5:
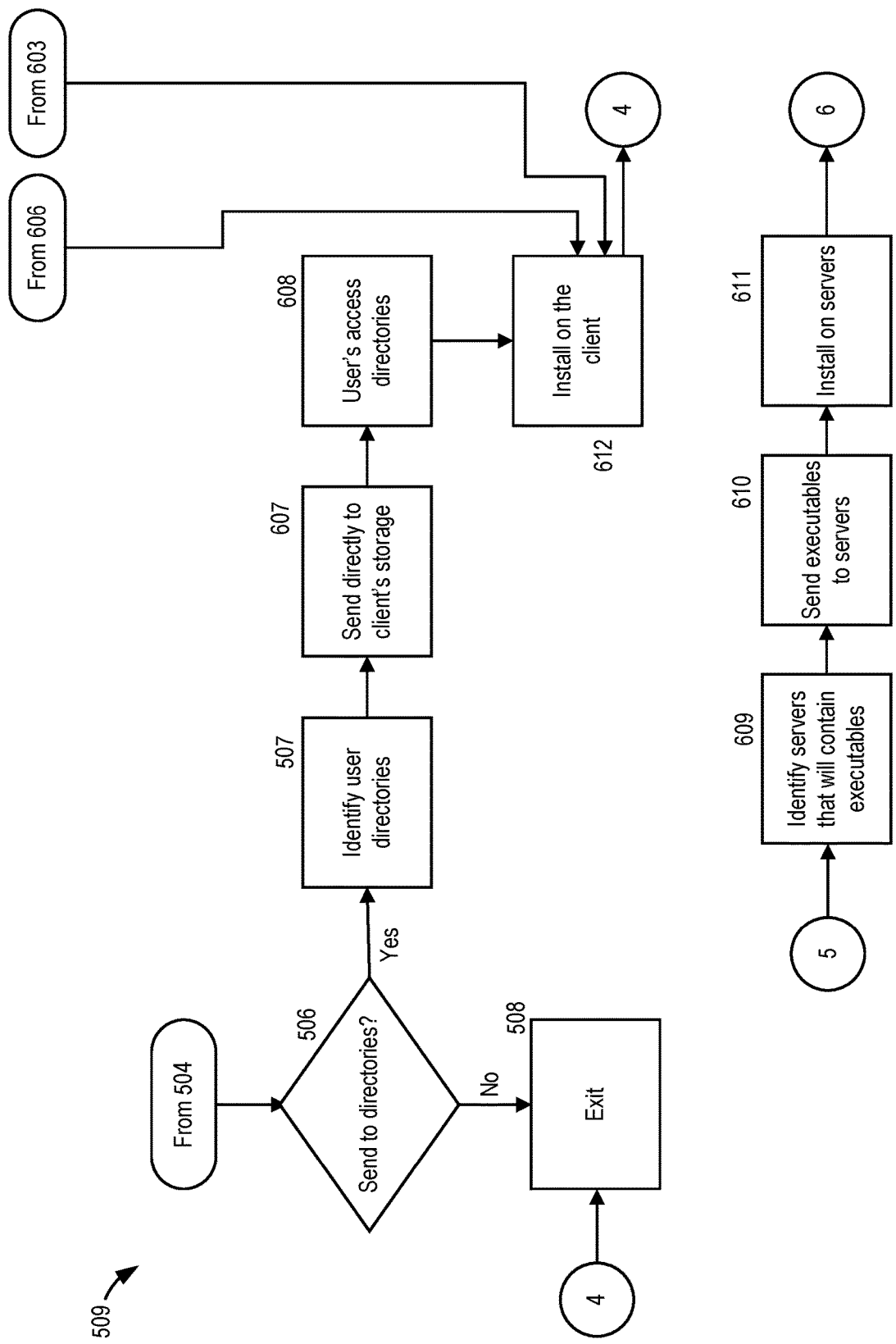

Now referring to FIG. 5, a flowchart of a method 509 is shown according to one approach. The method 509 may be performed in accordance with the present invention in any of the environments depicted in FIGS. 1-5, among others, in various approaches. Of course, more or fewer operations than those specifically described in FIG. 5 may be included in method 509, as would be understood by one of skill in the art upon reading the present descriptions.

Each of the steps of the method 509 may be performed by any suitable component of the operating environment. For example, in various approaches, the method 509 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 509. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with enabling and disabling private conversations among participants of a virtual group setting (e.g., group video conference) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 509, step 500 begins the deployment of the process software. An initial step is to determine if there are any programs that will reside on a server or servers when the process software is executed (501). If this is the case, then the servers that will contain the executables are identified (609). The process software for the server or servers is transferred directly to the servers' storage via FTP or some other protocol or by copying though the use of a shared file system (610). The process software is then installed on the servers (611).

Next, a determination is made on whether the process software is to be deployed by having users access the process software on a server or servers (502). If the users are to access the process software on servers, then the server addresses that will store the process software are identified (503).

A determination is made if a proxy server is to be built (600) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (601). The process software is sent to the (one or more) servers either via a protocol such as FTP, or it is copied directly from the source files to the server files via file sharing (602). Another approach involves sending a transaction to the (one or more) servers that contained the process software, and having the server process the transaction and then receive and copy the process software to the server's file system. Once the process software is stored at the servers, the users via their client computers then access the process software on the servers and copy to their client computers file systems (603). Another approach is to have the servers automatically copy the process software to each client and then run the installation program for the process software at each client computer. The user executes the program that installs the process software on his client computer (612) and then exits the process (508).

In step 504 a determination is made whether the process software is to be deployed by sending the process software to users via e-mail. The set of users where the process software will be deployed are identified together with the addresses of the user client computers (505). The process software is sent via e-mail (604) to each of the users' client computers. The users then receive the e-mail (605) and then detach the process software from the e-mail to a directory on their client computers (606). The user executes the program that installs the process software on his client computer (612) and then exits the process (508).

Lastly, a determination is made on whether the process software will be sent directly to user directories on their client computers (506). If so, the user directories are identified (507). The process software is transferred directly to the user's client computer directory (607). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (608). The user executes the program that installs the process software on his client computer (612) and then exits the process (508).

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
receiving a request to add a subset of participants on a group call to a private communication channel, wherein the group call includes a shared communication channel extending between the participants, the shared communication channel being configured to exchange information between the participants;
evaluating statuses of the participants in the subset; and
causing the subset of participants to be added to the private communication channel in response to determining (i) the participants in the subset are not already included on a different private communication channel, and (ii) the participants in the subset are not actively being added to a different private communication channel.

2. The computer-implemented method of claim 1, comprising:
denying the received request in response to determining that private communication channels are currently disabled on the group call,
wherein a host of the group call is configured to enable and disable use of private communication channels on the group call.

3. The computer-implemented method of claim 2, comprising:
receiving instructions to enable or disable the use of private communication channels on the group call; and
in response to determining that the instructions were received from the host of the group call, enabling or disabling the use of private communication channels on the group call.

4. The computer-implemented method of claim 1, comprising:
denying the received request in response to determining (i) the participants in the subset are already included on a different private communication channel, or (ii) the participants in the subset are actively being added to a different private communication channel.

5. The computer-implemented method of claim 1, comprising:
actively determining whether the participants in the subset are already included on a different private communication channel, and whether the participants in the subset are actively being added to a different private communication channel, wherein the determination is made based at least in part on the evaluated statuses of the participants in the subset,
wherein the group call is an audio and/or video call, wherein audio and/or video information is exchanged between the participants.

6. The computer-implemented method of claim 1, wherein causing the subset of participants to be added to the private communication channel includes, for each of the participants in the subset:
updating the status of the respective participant to indicate they are actively being added to the private communication channel;
assigning audio signals sent along the shared communication channel to a first audio channel configured to be played by a first speaker, the first speaker being coupled to an electronic device of the respective participant; and
assigning audio signals sent along the private communication channel to a second audio channel configured to be played by a second speaker, the second speaker being coupled to the electronic device of the respective participant.

7. The computer-implemented method of claim 6, comprising, for each remaining participant not in the subset:
assigning audio signals sent along the shared communication channel to the first and second audio channels configured to be played by the first and second speakers.

8. The computer-implemented method of claim 1, comprising:
in response to determining that one of the participants in the subset is already included on an initial private communication channel or actively being added to an initial private communication channel, causing the one of the participants to stop receiving and/or transmitting information over the shared communication channel; and
in response to the one of the participants being stopped from receiving and/or transmitting information over the shared communication channel, causing the one of the participants to be added to the private communication channel in addition to the initial private communication channel.

9. The computer-implemented method of claim 6, comprising, for each of the participants in the subset:
sending a notification requesting approval from the respective participant to join the private communication channel; and
updating the status of the respective participant to indicate they are actively being added to the private communication channel in response to receiving approval from the respective participant to join the private communication channel.

10. A computer program product, comprising a computer readable storage medium having program instructions embodied therewith, the program instructions readable by a processor, executable by the processor, or readable and executable by the processor, to cause the processor to:
receive a request to add a subset of participants on a group call to a private communication channel, wherein the group call includes a shared communication channel extending between the participants, the shared communication channel being configured to exchange information between the participants;
evaluate statuses of the participants in the subset; and
cause the subset of participants to be added to the private communication channel in response to determining (i) the participants in the subset are not already included on a different private communication channel, and (ii) the participants in the subset are not actively being added to a different private communication channel.

11. The computer program product of claim 10, wherein the program instructions are readable and/or executable by the processor to cause the processor to:
deny the received request in response to determining that private communication channels are currently disabled on the group call,
wherein a host of the group call is configured to enable and disable use of private communication channels on the group call.

12. The computer program product of claim 11, wherein the program instructions are readable and/or executable by the processor to cause the processor to:
receive instructions to enable or disable the use of private communication channels on the group call; and
in response to determining that the instructions were received from the host of the group call, enable or disable the use of private communication channels on the group call.

13. The computer program product of claim 10, wherein the program instructions are readable and/or executable by the processor to cause the processor to:
deny the received request in response to determining (i) the participants in the subset are already included on a different private communication channel, or (ii) the participants in the subset are actively being added to a different private communication channel.

14. The computer program product of claim 10, wherein the group call is an audio and/or video call, wherein audio and/or video information is exchanged between the participants.

15. The computer program product of claim 10, wherein causing the subset of participants to be added to the private communication channel includes, for each of the participants in the subset:
updating the status of the respective participant to indicate they are actively being added to the private communication channel;
assigning audio signals sent along the shared communication channel to a first audio channel configured to be played by a first speaker, the first speaker being coupled to an electronic device of the respective participant; and
assigning audio signals sent along the private communication channel to a second audio channel configured to be played by a second speaker, the second speaker being coupled to the electronic device of the respective participant.

16. The computer program product of claim 15, wherein the program instructions are readable and/or executable by the processor to cause the processor to, for each remaining participant not in the subset:
assign audio signals sent along the shared communication channel to the first and second audio channels configured to be played by the first and second speakers.

17. The computer program product of claim 15, wherein audio signals sent along the first audio channel are only played by the first speakers, wherein audio signals sent along the second audio channel are only played by the second speakers.

18. The computer program product of claim 15, wherein the program instructions are readable and/or executable by the processor to cause the processor to, for each of the participants in the subset:
send a notification requesting approval from the respective participant to join the private communication channel;
update the status of the respective participant to indicate they are actively being added to the private communication channel in response to receiving approval from the respective participant to join the private communication channel; and
modify settings of the private communication channel based at least in part on the statuses of the participants in the subset,
wherein the statuses of the participants in the subset are evaluated using a machine learning model that has been trained using past performance of the participants.

19. A system, comprising:
a processor; and
logic integrated with the processor, executable by the processor, or integrated with and executable by the processor, the logic being configured to:
receive a request to add a subset of participants on a group call to a private communication channel, wherein the group call includes a shared communication channel extending between the participants, the shared communication channel being configured to exchange information between the participants;
using a trained machine learning model to evaluate statuses of the participants in the subset; and
cause the subset of participants to be added to the private communication channel in response to determining (i) the participants in the subset are not already included on a different private communication channel, and (ii) the participants in the subset are not actively being added to a different private communication channel.

20. The system of claim 19, wherein causing the subset of participants to be added to the private communication channel includes, for each of the participants in the subset:
updating the status of the respective participant to indicate they are actively being added to the private communication channel;
assigning audio signals sent along the shared communication channel to a first audio channel configured to be played by a first speaker, the first speaker being coupled to an electronic device of the respective participant; and
assigning audio signals sent along the private communication channel to a second audio channel configured to be played by a second speaker, the second speaker being coupled to the electronic device of the respective participant,
wherein the machine learning model has been trained using past performance of the participants.

* * * * *